United States Patent [19]

Mikheev et al.

[11] Patent Number: 5,040,154
[45] Date of Patent: Aug. 13, 1991

[54] METHOD OF MONITORING THE STATE OF EXTENDED SHELL

[76] Inventors: Sergei M. Mikheev, ulitsa Zelenodolskaya, korpus 5, kv. 72; Valery N. Zemerov, prospekt Vernadskogo 67, kv. 16; Petr V. Elshansky, Volzhsky bulvar, 6, korpus 1, kv. 17, all of Moscow, U.S.S.R.

[21] Appl. No.: 395,064
[22] PCT Filed: Sep. 28, 1988
[86] PCT No.: PCT/SU88/00190
§ 371 Date: Aug. 28, 1989
§ 102(e) Date: Aug. 28, 1989
[87] PCT Pub. No.: WO89/03972
PCT Pub. Date: Mar. 5, 1989

[30] Foreign Application Priority Data

Oct. 30, 1987 [SU] U.S.S.R. .................................. 4319015

[51] Int. Cl.$^5$ ............................ G01L 1/24; G02B 6/16
[52] U.S. Cl. .................................. 367/13; 250/227.24; 356/32; 73/800; 385/147
[58] Field of Search .................... 367/13; 250/227.24; 350/96.29, 96.23; 73/800; 356/32

[56] References Cited

U.S. PATENT DOCUMENTS 4,459,022 7/1984 Morey .......................... 250/227.28
4,654,520 3/1987 Griffiths ........................ 350/96.23
4,927,232 5/1990 Griffiths ........................ 250/227.24

FOREIGN PATENT DOCUMENTS 2134657 5/1974 Fed. Rep. of Germany.
2543377 4/1977 Fed. Rep. of Germany.
58-24725 5/1983 Japan.
608098 12/1978 Switzerland.
1293348 10/1972 United Kingdom.

Primary Examiner—Daniel T. Pihulic
Attorney, Agent, or Firm—Burgess, Ryan & Wayne

[57] ABSTRACT

The method of monitoring the state of an extended line is based on using an extended line (4) of transmission of wave energy as a distributed responsive element and a channel for transmission of data on varying geometry of the surface of an extended shell (1). With the surface area of the shell (1) divided into elementary portions (2) of an arbitrary shape, of an area either equal to or smaller than the area of the predetermined resolution of the monitoring procedure, the extended line (4) of transmission of wave energy positioned and secured along the respective perimeters of the defined elementary portions (2), and the distribution of the curvature of the surface along the axis of said line (4) measured in an appropriate manner, there are obtained the values of the two major curvatures of the surface of each defined elementary portion (2). By analyzing variations of the major curvature values, there are determined the characteristics of the strained and deformed state of the shell (1).

1 Claim, 3 Drawing Sheets

METHOD OF MONITORING THE STATE OF EXTENDED SHELL

TECHNICAL FIELD

The present invention relates to monitoring and measuring techniques, and, more particularly, it relates to methods of monitoring the state of an extended shell.

Extended shells monitored in accordance with the invention can be roofs of permanent structures, casings of machines, vehicles, aircraft and ships, the surfaces of dams of hydroelectric projects, the reflectors of aerials and radio telescopes, the faces and surfaces of mine workings, implantable artificial human organs.

BACKGROUND ART

There is known a method of monitoring the state of an extended cylindrical shell, e.g. a marine riser in offshore drilling (ARG-Telefunken, BRD. "Position Measuring System for Offshore Installations. System design and mathematical description", 1980, 10 pp.).

The known method includes the steps of selecting a sensitive element resposive to variation of the monitored parameter, e.g. the geometry of the surface of an extended shell, representative of the state of this shell, providing an extended line of transmission of wave energy carrying information on variation of the monitored parameter, matching the selected responsive element and extended line of transmission of wave energy, positioning the matched responsive element and extended line of transmission of wave energy in the zone of monitoring lengthwise of a specified running coordinate along which the monitored parameter is expected to vary, shaping and feeding to the input of the extended line of transmission of wave energy a time-modulated reference signal transformable in its propagation along this line in accordance with the variation of the monitored parameter representative of the state of the extended shell, measuring the parameters of the transformed reference signal at the output of the extended line of transmission of wave energy, and employing the measured parameters of the transformed reference signal for determining the mechanical characteristics of the state of the extended shell along the specified coordinate along which the monitored parameter varies. These basic steps of the method of AEG-Telefunken are specifically implemented, as follows.

In this known method, the monitores parameters representative of the state of an extended shell—a marine riser—are the angle of deviation of the axis of the marine riser from a vertical line and twist angles in the horizontal plane of the uppermost and lowermost parts of the riser. Hence, the selection of responsive elements is carried out by providing special-design sensors responding to variations of the above angles, i.e. inertia-type inclinometers and magnetic compasses. Then the extended line of transmission of wave energy is provided in the form of a shielded electric cable with a polyethylene protective sheath. The matching of the selected sensors and cable is effected by providing inductive coupling therebetween. The matched sensors and cable are secured on the surface of a marine riser lengthwise of its axis. To obtain sufficient data on the geometry of the longitudinal axis in the three-dimensional space, the sensors of deviation of the axis from the vertical line are arranged and secured along two orthogonal generatrices on the surface of the marine riser. Then the reference electric signal time-varying at a 400 Hz frequency is fed to the input of the cable. While propagating along the cable, the reference signal supplies the sensors with power through their inductive coupling and collects from them the information on the angles, but at a frequency substantially higher than the carrier frequency of 400 Hz. The parameters of the transformed reference electric signal are measured at the output of the cable, the information thus obtained is decoded, and the data on the angles of twist and deviation of the longitudinal axis of the riser from the vertical line are employed for determining the mechanical or physical characteristics of the state of the riser. The characteristics thus obtained define unambiguously the strained/deformed state of the marine riser and the relative positions in space of its two extreme points for dynamic positioning.

The essential limiting traits of the known method of monitoring the state of an extended cylindrical shell are, as follows.

The method is unsuitable for monitoring extended shells with high resolution and at considerable distances from the monitored object, on account of limited information capacity of the extended line of transmission of wave energy, to say nothing of the reliability of information transmission being severely affected with a growing length of the line and correspondingly growing levels of disturbances and voltage losses in this line. The employment of descretely positionable responsive elements in the form of angle or displacement sensors would not provide in principle for continuous measurement of the distribution of a monitored parameter, it only being possible to approximate the distribution of the parameter from discretely obtained measurements along a specified coordinate, e.g. of the angles of deviation of the surface of the marine riser from the vertical line. Therefore, it is impossible in principle to monitor the mechanical characteristics of a shell that are continuous both in space and in time, which inevitably results in approximation errors. Furthermore, the overall monitoring accuracy is also affected by considerable errors of the sensors themselves. The matching of the responsive elements with the extended line of transmission of wave energy in the electro-mechanical manner, i.e. through inductive coupling and a special type of securing a responsive element with respect to the line, with sensors of different kinds involved, necessitates a complicated procedure of interrogation of these sensors with the use of specifically manufactured costly electronic hardware in underwater makes which is not entirely reliable.

Moreover, the emplyed sensors of angles of deviation of a generatrix of the surface of a marine riser from the vertical line impose substantial limitations upon the dynamic measurement range, which would not allow to monitor the surface of marine risers in their considerable deformation. Neither is it possible to use one and the same method of the above-discussed type for monitoring different kinds of extended shells, or else to enhance the resolution of the monitoring and measuring operation without increasing the number of the sensors and reducing their spacing.

The closest prior art of the present invention by its technical essence is the method of monitoring the state of an elongated object which can also be an extended shell (PCT/SU 88/00082), including the steps of selecting an extended line of transmission of wave energy providing for propagation of signals therein in the form of modes with known space- and time-related patterns of physical fields, positioning the selected line of transmission of wave energy on the surface of an extended shell along a specified running coordinates S, defining in the extended line of transmission of wave energy at least one reference channel and at least one measurement channel with known values of deceleration of phase velocities of the modes in each of these channels, providing for directional interaction lengthwise of the extended line of transmission of wave energy of the fields of the modes of the at least one reference channel and at least one measurement channel in accordance with varying geometry of the surface of the extended shell, for producing in the measurement channel a signal varying in the course of propagation of a signal in the reference channel in accordance with the varying geometry of the surface of the extended shell, representative of the state of this shell, shaping a time-modulated reference signal in the form of oscillations of physical fields and transforming these oscillations into a signal with predetermined space- and time-related patterns of the fields of the modes, converting the fields of the modes at the respective outputs of the at least one reference channel and at least one measurement channel of the extended line of transmission of wave energy into exclusively time-dependent electric signals, extracting the amplitude of the electric signal at the output of the reference channel, amplifying the electric signal at the output of the measurement channel in inverse proportion to the value of the amplitude of the electric signal at the output of the reference channel, employing a linear scale transform relating the value of the difference between the decelerations of the phase velocities, respectively, of the modes of the reference and measurement channels of the extended line of transmission of wave energy to the running time of monitoring and to measurements of the values of the specified running coordinate lengthwise of the extended line of transmission of wave energy, and determining the geometry of the surface of the extended shell.

The last-described known method of monitoring the state of an extended shell, which is the closest prior art of the present invention, has, however, several inherent limitations.

In this method of the prior art, as an extended line of transmission of wave energy is positioned on the surface of an extended shell, e.g. a curving pipeline, there would not be enhanced the accuracy of monitoring the geometry of the surface of the extended shell on account of the absence of element-wise detection of integral characteristics of the surface of the extended shell, with subsequent composition of these characteristics with the aim of unambiguous determination of the geometry of the surface of the extended shell, and, consequently, of its strained and/or deformed state.

DISCLOSURE OF THE INVENTION

The object of the present invention is to create a method of monitoring the state of an extended shell, which would make it possible to determine, element by element, integral characteristics of the surface of an extended shell with subsequent composition of said characteristics for unambiguous evaluation of the state of the surface of an extended shell affected by external loads, thereby enhancing the accuracy of monitoring the surface geometry of an extended shell and, in effect, enhancing the accuracy of monitoring the strained and deformed state of the shell in space.

There is provided a method of monitoring the state of an extended shell, including the following successive steps: selecting an extended line of transmission of wave energy providing for propagation of signals therein in the form of modes with known space- and time-related patterns of physical fields, positioning the selected line of transmission of wave energy on the surface of an extended shell along a specified running coordinate S, defining in the extended line of transmission of wave energy at least one reference channel and at least one measurement channel with known values of deceleration of phase velocities of the modes in each one of these channels, providing for directional interaction lengthwise of the extended line of transmission of wave energy of the fields of the modes of at least one reference channel and at least one measurement channel in accordance with varying geometry of the surface of the extended shell, for producing in the measurement channel a signal varying in the course of propagation of a signal in the reference channel in accordance with the varying geometry of the surface of the extended shell, representative of the state of this shell, shaping a time-modulated reference signal in the form of oscillations of physical fields and converting these oscillations into a signal with predetermined space- and time-related patterns of the fields of the modes, converting the fields of the modes at the respective outputs of at least one reference channel and at least one measurement channel of the extended line of transmission of wave energy into exlusively time-dependent electric signals, extracting the amplitude of the electric signal at the output of the reference channel, amplifying the electric signal at the output of the measurement channel in inverse proportion to the value of the amplitude of the electric signal at the output of the reference channel, employing a linear scale transform relating the value of the difference between the decelerations of the phase velocities, respectively, of the modes of the reference and measurement channels of the extended line of transmission of wave energy to the running time of monitoring and to measurements of the values of the specified running coordinate lengthwise of the extended line of transmission of wave energy, and determining the geometry of the surface of the extended shell, which, in accordance with the present invention, further comprises the steps of presetting the required resolution of the monitoring procedure over the surface area of the extended shell, dividing the surface area of the extended shell into elementary portions of an arbitrary shape, with the surface area of each such portion being either equal to or short of the surface area of the predetermined resolution of monitoring the state of the extended shell, placing the external line of transmission of wave energy positioned on the surface of the extended shell along the perimeters of all the thus defined successive portions and securing it to the surface of the extended shell along the perimeters of the thus defined portions, providing for directional interaction of the fields of the modes of at least one reference channel and at least one measurement channel lengthwise of the extended line of transmission of wave energy in dependence on the curvature of the longitudinal axis of the extended line of transmission of wave energy, determining the values of the curvature of the surface of the extended shell along the specified running coordinate S from normals to this surface intersecting the longitudinal axis of the extended line of transmission of wave energy, and employing the obtained values of the curvature of the surface of the extended shell for finding and registering the initial values of the two major curvatures for each defined portion, corresponding to the initial state of the extended shell, then determining the two current values of the major curvatures for each portion, and comparing the current values of the major curvatures with the initial registered values of the major curvatures to determine the integral characteristics for each portion in determining the geometry of the surface of the extended shell.

The invention enables to cut dozens of times the cost of measurement and monitoring jobs in conducting strength and fatigue testing of the fuselages or airframes of aircraft, the hulls of ships, the covers and protective enclosures of permanent structures by eliminating the necessity of providing and positioning costly and sophisticated measurement equipment, and by allowing to do with fewer operators. The lasting effect of the present invention can be also traced to precluding the losses incurred by failing structures, e.g. metal roofs, as unmonitored loads applied to roofs of various buildings including industrial enterprises in numerous cases have caused their breakdown. Furthermore, the present invention allows to cut the investment into the construction of various shell-like structures by reducing the number of constructed supports, while ensuring reliable monitoring of the state of the surface of the shell with high resolution over its area. It is also feasible to enhance substantially the efficiency of radar, communication and radio telescope aerials by providing for precise determination of their surface geometry.

BRIEF DESCRIPTION OF THE DRAWINGS

The present invention will be further described in connection with an example of the implementation of the disclosed method, substantiating the feasibility of obtaining the goals of the invention, with reference being made to the accompanying schematic drawings, wherein.

BEST MODE OF CARRYING OUT THE INVENTION

Figure 1:
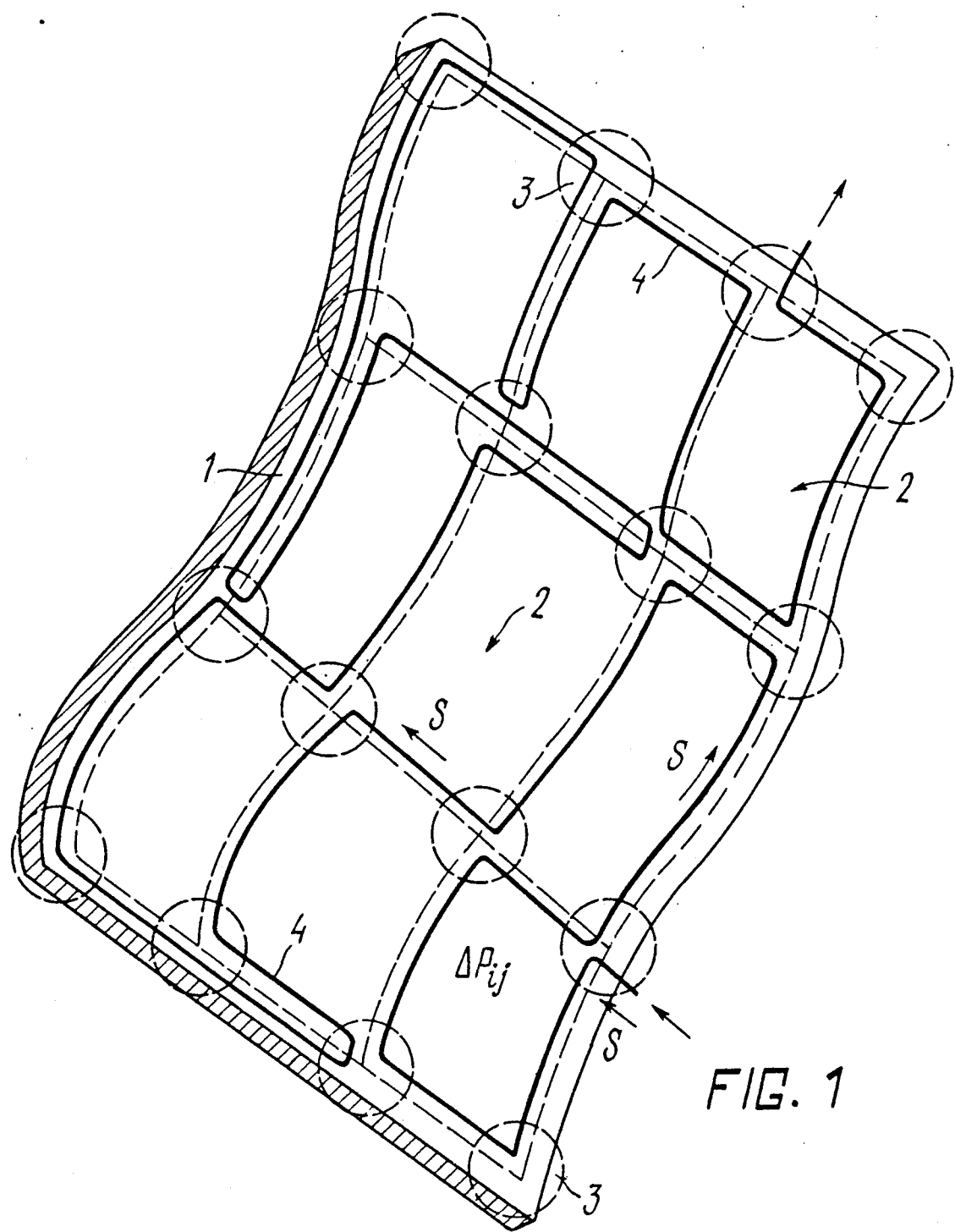
FIG. 1 schematically illustrates in a perspective view a monitored extended shell having an extended line of transmission of wave energy secured to its surface, in accordance with the invention.

Referring now to the drawings, the extended shell 1 illustrated schematically in FIG. 1 has its surface conditionally broken down by dash lines into a plurality of rectangular elementary portions 2 having each three nodal zones 3. These nodal zones 3 along a predetermined running coordinate S are successively traversed by an extended line 4 of transmission of wave energy, secured to the surface of the extended shell 1. The surface area of each thus defined portion 2 is either short of or equal to the predetermined resolution of monitoring the state of the extended shell 1 and designated $\Delta P_{ij}$. Shown in more detail on the surface of one such portion 2 (FIG. 2) is the extended line 4 of transmission of wave energy, two major curvatures $\tilde{K}_{1ij}$ and $\tilde{K}_{2ij}$ and the normal $\bar{n}$ to the surface of the shell, and the right angles defined by the adjacent stretches of the extended line 4 of transmission of wave energy, converging in each nodal zone 3, and the direction of measurement of the specified cylindrical or arcuate running coordinate S along the longitudinal axis 5 of the extended line 4 of transmission of wave energy.

Figure 2:
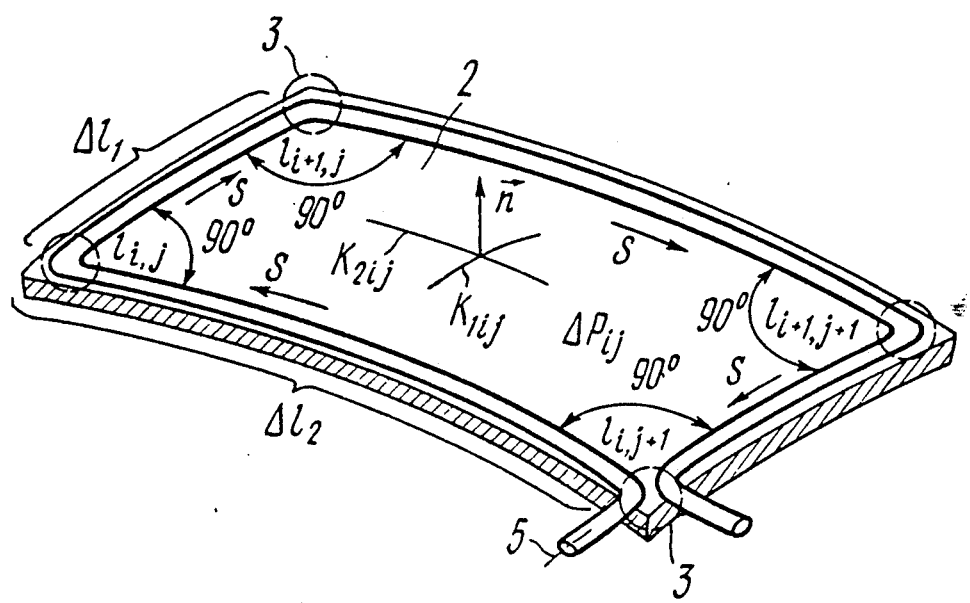
FIG. 2 shows on a larger scale a rectangular portion of the monitored extended shell of FIG. 1, with the respective part of the extended line of transmission of wave energy secured to its surface, in accordance with the invention.

The centres of the nodal zones 3 shown in FIGS. 1 and 2 as circles have their respective coordinates designated $l_{ij}$, $l_{i+1,j}$, $l_{i+1,j+1}$, $l_{i,j+1}$. The distances between the adjacent pairs of the nodal zones 3 lengthwise of the extended line 4 of transmission of wave energy are designated $\Delta l_1$ and $\Delta l_2$. The surface area of a portion 2 can be expressed as:

$$\Delta P_{ij} = \Delta l_1 \cdot \Delta l_2.$$

Figure 3:
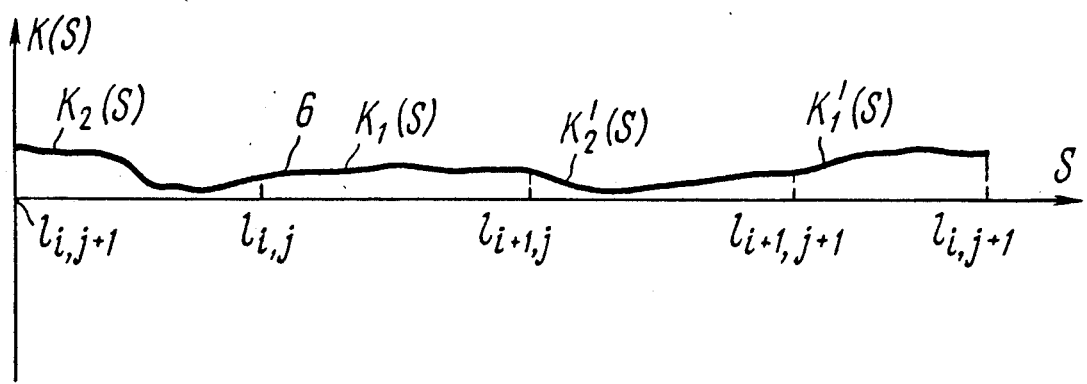
FIG. 3 is a plot illustrating the dependence of the curvature of the surface of the extended shell along the perimeter of the defined portion lengthwise of the specified coordinate S, in accordance with the invention.

The plot in FIG. 3 shows the curve 6 of dependence of the curvature K(S) about the perimeter of a defined portion 2 of the surface of the extended shell 1 on the running coordinate S, measured by the extended line 4 of transmission of wave energy. For a defined portion 2 of the extended shell 1, measurements of the curvature K(S) are conducted with the aid of normals to the surface of the extended shell 1, intersecting the longitudinal axis 5 of the line 4.

An apparatus capable of performing the disclosed method of monitoring the state of the extended shell 1 comprises a source 7 (FIG. 4) of modulated wave energy, the extended line 4 of transmission of wave energy, positioned in the zone of monitoring the extended shell 1 along a specified running coordinate S and intended for capturing and transmitting information on varying geometry of the surface of the extended shell 1, corresponding to the geometry of its longitudinal axis 5. The extended line 4 of transmission of wave energy is in the form of a multimode waveguide with at least one reference channel and at least one measurement channel, interacting in dependence on the varying geometry of the extended shell 1.

The apparatus for monitoring the state of the extended shell 1 further includes a unit 8 for analog processing of the information, intended for extracting from the extended line 4 of transmission of wave energy the reference signal transformed by this line 4, for determining the characteristics of the strained and/or deformed state of the extended shell 1, and a spatial filter 9 adapted for shaping the reference signal of the space- and time-related pattern of a specified mode, connected between the output of the source 7 of modulated wave energy and the extended line 4 of transmission of wave energy. The spatial filter 9 has inputs 10, 11, and the zone of connection of the spatial filter 9 with the extended line 4 of transmission of wave energy is indicated by numeral 12.

The apparatus for monitoring the state of the extended shell 1 also includes a spatial filter 13 adapted for converting the output signal of the extended line 4 of transmission of wave energy, of a known space- and time-related pattern of the mode, into an exclusively time-dependent electric signal. The filter 13 is joined to the extended line 4 by a zone 14, and is connected between the extended line 4 and the inputs of the unit 8 for analog processing of the information. The spatial filter 13 has outputs 15 and 16.

The spatial filters 9, 13 are preferably identical and may have any suitable known structure corresponding to the type of the extended line 4 of transmission of wave energy employed. Thus, when the line 4 is in the form of a square-section waveguide using as its reference and measurement channels the waves $H_{10}$, $H_{20}$, the filter 9 or 13 is a 3-dB slot bridge hybrid (not shown in the drawing) serially connected to the waveguide, its arms being joined to the waveguide through two respective static phase shifters with a differential phase shift $\pi/2$. In an optical range of wavelengths, examples of suitable spatial filters and principles of their design depending on the wave types are described, e.g. in the Journal of Optocal Society of America, Vol. 60, No. 9, 1980, N. S. Kapany et al. "Fiber Optics. XII. A technique for launching an arbitrary mode on an optical dielectric waveguide", p. 1182.

The apparatus for monitoring the state of the extended shell 1 further comprises a video display terminal 17 intended for presenting the geometry of the surface of the extended shell 1 and the obtained characteristics of the strained and/or deformed state of this shell 1, having its input electrically connected to the output of the analog processing unit 8.

The source 7 of modulated wave energy includes a signal generator (oscillator) 18 having its output connected to the input 10 of the spatial filter 9, and a modulator 19 having its output connected to the input of the signal generator 18.

The source 7 of modulated wave energy may be a standard generator of oscillations of a physical field, e.g. a laser, a microwave oscillator, a generator of elastic vibrations.

The analog information processing unit 8 includes synchronous detectors 20, 21 having their respective first inputs connected to the outputs 15, 16 of the spatial filter 13, an integrator 22, an operational amplifier 23 having its first input connected to the output of the integrator 22 and its output connected electrically with the input of the video display terminal 17, the input of the integrator 22 being connected to the output of the synchronous detector 21 and the second input of the operational amplifier 23 being connected to the output of the synchronous detector 20, and an oscillator 24 having its output connected to the respective other inputs of the synchronous detectors 20, 21.

The apparatus for monitoring the state of the extended shell 1 includes a directional coupler 25 for synchronizing the oscillator 24, for which purpose the output of the directional coupler 25 is connected to the input of the oscillator 24. The connections between the spatial filter 13 with the prespective synchronous detectors 20, 21 are shielded inside grounded screens 26.

The apparatus for monitoring the state of the extended shell 1 further includes an A-D (analog-to-digital) converter 27 having its input connected to the output of the analog information processing unit 8 and a microprocessor 28 of which the input is connected to the output of the A-D converter 27 and the output is connected to the input of the video display terminal 17.

The apparatus for monitoring the state of an extended shell performs the method of the present invention, as follows. The parameter being monitored in this implementation of the method as representative of the state of the extended shell 1 (FIG. 4) is the sign-variable distribution of the curvature of the surface of the shell 1 along the running arcuate coordinate S. Rigidly associated with the extended shell 1 is the extended line 4 of transmission of wave energy, wherein disturbances of regular wave processes take place in deformation of the surface of the extended shell 1.

The monitoring operation begins with the modulator 19 generating a sequence of pulses modulating the oscillations of the signal generator 18. The duration and recurrence rate of the modulating pulses are determined from the required parameters of the monitoring procedure, namely, by the dynamic measurement range and its resolution, as also from the parameters of the extended line 4 of transmission of wave energy. The signal generator (oscillator) 18 feeds out from its output a pulsed train of coherent oscillations, e.g. of a microwave electromagnetic field. This train of coherent oscillations is fed to the input 10 of the spatial filter 9. In this filter 9 the spatial structure of the microwave field is converted so that in the zone 12 this structure corresponds the required structure of the fields of the modes of the defined reference channel of the extended line 4. In this way the reference signal is shaped and fed into the extended line 4. While propagating along the reference channel, this signal excited pulses in the measurement channel at the points of flexure of the extended line 4 of transmission of wave energy, forming a measurement signal coherent with the reference signal. However, the pulses propagate along the measurement channel at a velocity different from the velocity of propagation of the reference signal.

Upon crossing the zone 14, the microwave fields of the modes of the reference signal and measurement signal are separated in space by the filter 13 and come to the latter's wave field energy outputs 15 and 16 connected to the respective inputs of the analog information processing unit 8. In this way the converted measurement and reference signals enter the unit 8, with the measurement signal being fed to the first input of the synchronous detector 20 and the reference signal being fed to the input of the directional coupler 25 which branches off a small part of the energy of the reference signal for synchronizing the oscillator 24, the rest of this energy being supplied to the first input of the synchronous detector 21. Simultaneously, the other respective inputs of the synchronous detectors 20 and 21 are fed with the signal coming from the oscillator 24 in the form of a microwave field coherent with the reference signal, enabling synchronous detection of the microwave fields (while retaining the sign of the envelope of the microwave pulses of the measurement signal). In this way the synchronous detectors 20, 21 feed out respective electric signals, the signal at the output of the synchronous detector 21 being proportional to the envelope of the reference signal and the signal at the output of the synchronous detector 20 being proportional to the envelope of the measurement signal, accounting for its sign, which last-mentioned envelope, in its turn, reflects the distribution of the increments of curvature along the specified running coordinate S of the surface of the extended shell 1.

Figure 4:
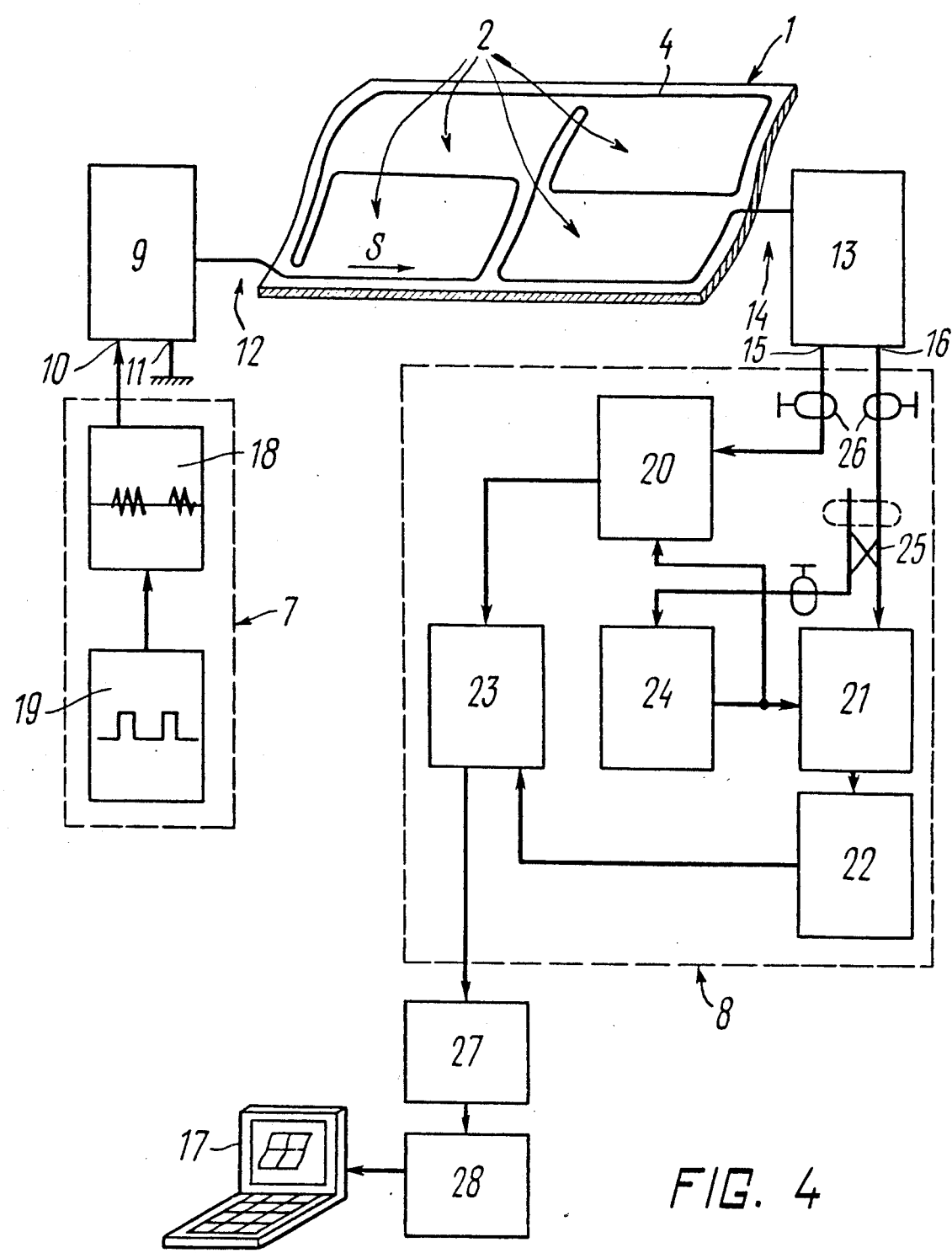
FIG. 4 is a structural block-unit diagram of an apparatus capable of performing a method of monitoring the state of an extended shell, in accordance with the invention.

The electric pulses initiated by the reference signal are fed from the output of the synchronous detector 21 to the input of the integrator 22 which develops at its own output an electric signal corresponding to the amplitude of the input pulsed signal, this integral amplitude signal being fed from the output of the integrator 22 to the first input of the operational amplifier 23. The second input of the operational amplifier 23 is fed with the output signal of the synchronous detector 20. The operational amplifier feeds out at its output an electric signal whose value is determined solely by the value of the integral over the increments of the curvature of the surface of the extended shell 1 and does not depend on the values of the signal at the input 10 of the spatial filter 9 and at the output 16 of the spatial filter 13. The output signal of the operational amplifier 23, corresponding to the distribution of curvature of the surface of the extended shell 1 along the extended line 4 of transmission of wave energy and serving as the output signal of the analog information processing unit 8 is converted to digital form by the A-D converter 27, to be fed to the microprocessor 28. For each defined portion or element 2 of the surface of the extended shell 1 whose surface area $\Delta P_{ij}$ (FIG. 2) is either short of or equal to the area of predetermined resolution of monitoring the state of the extended shell, the measured distribution of curvature K(S) over the perimeter of the portion 2 is used to determine the values of the two major curvatures in the initial, e.g. unstrained state of the extended shell. The composition of obtained values of the two major curvatures for each defined element 2 of the surface of the extended shell 1 (FIG. 1), corresponding to the initial or unstrained state of the shell 1 is written into the memory of the microprocessor 28 (FIG. 4). Then the two current major curvatures for each defined elementary portion 2 are determined with the extended shell 1 aready loaded or strained. The thus obtained composition for the loaded or strained state of the extended shell 1 is compared in the microprocessor 28 with the composition of the major curvature values of the initial state of the extended shell 1. The outcome of the comparison of the two compositions yields the integral characteristics for each elementary portion 2 in determining the surface geometry of the extended shell 1, and, hence, its strained and/or deformed state. The digital output of the microprocessor 28 displays these characteristics in either graphic or digital form, or both, on the video display terminal 17.

The operations of defining a portion 2 (FIGS. 1, 2) of the extended shell 1 are illustrated by selecting on the surface of this shell 1 a portion 2 of a rectangular shape with four nodal zones 3. The surface area $\Delta P_{ij}$ (FIG. 2) of the rectangular portion 2 can be expressed as:

$$\Delta P_{i,j} = \Delta l_1 \cdot \Delta l_2, \qquad /1/$$

where $\Delta l_1 = l_{i+1,j} - l_{i,j} = l_{i,j+1} - l_{i+1,j+1};$
$\Delta l_2 = l_{i+1,j+1} - l_{i+1,j} = l_{i,j} - l_{i,j+1};$ $l_{i,j}, l_{i+1,j}, l_{i,j+1}, l_{i+1,j+1}$ being the respective coordinates of the centres of the nodal zones 3 with the corresponding symbols in FIG. 2.

For this elementary portion 2, there are determined the main integral characteristics, i.e. the values of the two major curvatures $\check{K}_{1ij}$ and $\check{K}_{2ij}$ of the surface of the portion 2 from the values of the curvature K(S) of the extended line 4 of transmission of wave energy along the specified running coordinate S from expressions:

$$\check{K}_{1ij} = \frac{1}{\Delta l_1} \left( \int_{l_{i,j}}^{l_{i+1,j}} K_1(S)dS - \int_{l_{i,j+1}}^{l_{i+1,j+1}} K_1{}^1(S)dS \right)$$

-continued $$\check{K}_{2ij} = \frac{1}{\Delta l_2} \left( \int_{l_{i,j}}^{l_{i,j+1}} K_2(S)dS - \int_{l_{i+1,j}}^{l_{i+1,j+1}} K_2{}^1(S)dS \right),$$

where

S is the specified running arcuate coordinate measured lengthwise of the longitudinal axis 5 of the extended line 4 of transmission of wave energy;

$K_1(S)$, $K_1'(S)$, $K_2(S)$ and $K_2'(S)$ are the distributions of curvature measured by the extended line 4 of transmission of wave energy along the normals to the surface of the portion 2, intersecting the longitudinal axis 5 of the extended line 4, for the respective sides of the perimeter of the portion 2.

The surface area $\Delta P_{i,j}$ of the defined elementary portion 2 should be either short of or equal to the required area resolution of monitoring the state of the extended shell 1. As such monitoring is ultimately dictated by the practical requirements put before real-life objects, and in the case of an extended shell is associated with its surface area, the area resolution is understood as the required minimum surface area to be accounted for from the monitoring viewpoint.

Having determined the two initial values of the major curvatures $\check{K}_{1ij}°$ and $K_{2ij}°$ of the surface of the elementary portion 2 for the initial (unstrained and undeformed) state of the extended shell 1 and subsequently determined the current values of these major curvatures $\check{K}_{1ij}$ and $K_{2ij}$ with the shell 1 under load for the same portion 2, the commonly known ratio of mechanics of shells can be employed for determining another essential integral characteristic of the surface of the elementary portion 2, i.e. its relative deformation $\delta_z$ in the direction of the normal $\bar{n}$ (FIG. 2):

$$\delta_z + = (\check{K}_{1ij}° - \check{K}_{1ij})\Delta l_1 + (\check{K}_{2ij}° + \check{K}_{2ij})\Delta l_2.$$

Other known formulae of differential geometry can be used for determining from the two major curvatures of the surface of the portion 2 the angle of deviation of the normal $\bar{n}$ from its initial position corresponding to the initial (unloaded) state of the extended shell 1, representative of the twisting or warping of the surface of the portion 2 of the extended shell 1, and also the variation of the surface area $\Delta P_{ij}$ of this portion 2 due to either extension or compression under load.

Thus, by implementing the disclosed sequence of steps of defining an elementary portion 2 and obtaining its major integral characteristics, the digital output of the A-D converter 27 (FIG. 4) processed in the microprocessor 28, first, for obtaining and registering the initial values, and then for obtaining the current values of the two major curvature for each defined portion 2 of the extended shell 1, yields the geometry of the surface of each elementary portion 2 of the extended shell 1. Following the combining of the information in the microprocessor 28 pertaining to every elementary portion 2, the obtained composition is analyzed with the use of the traditional procedures of the mechanics of shells as the strained and/or deformed state of the extended shell 1, as a whole. The outcome of such analysis displayed on the video terminal 17 provides for avoiding emergencies and accidents and for forecasting the performance of the extended shell 1 in question.

Thus, the present invention provides for highly accurate monitoring of the state of an extended shell with adequately complete determination of the major integral characteristics of each defined elementary portion and their subsequent composition for an analysis and presentation of the characteristics of the state of the entire surface of the extended shell.

INDUSTRIAL APPLICABILITY

The invention can be implemented in various fields of science, technology and industrial production, whereever the state of extended shells has to be monitored. Among the promising fields of applications of the invention can be named:

construction and operation of buildings, architectural objects, special shell-like structures;

general and automotive engineering, shipbuilding and aircraft manufacture where the strained and deformed state of housings and casings has to be inspected and monitored in the process of their making, testing and operating;

mining industries and geology, for studying the geometry of the surfaces of mine workings and shafts;

medical practice where the state of artificial implanted organs of the shell type has to be monitored;

communications and radar installations, for monitoring the geometry of aerial surfaces.

We claim:

1. A method of monitoring the state of an extended shell, comprising the successive steps of selecting an extended line (4) of transmission of wave energy providing for propagation of signals therein in the form of modes with known space- and time-related patterns of physical fields, positioning the selected extended line (4) of transmission of wave energy on the surface of an extended shell (1) along a specified running coordinate S, defining in the extended line (4) of transmission of wave energy at least one reference channel and at least one measurement channel with known values of deceleration of phase velocities of the modes in each one of these channels, providing for directional interaction lengthwise of the extended line (4) of transmission of wave energy of the fields of the modes of at least one reference channel and at least one measurement channel in accordance with varying geometry of the surface of the extended shell (1), for producing in the measurement channel a signal varying in the course of propagation of a signal in the reference channel in accordance with the varying geometry of the surface of the extended shell (1), representative of the state of said shell (1), shaping a time-modulated reference signal in the form of oscillations of physical fields and converting these oscillations into a signal with predetermined space- and time-related patterns of the modes, converting the fields of the modes at the respective outputs of at least one reference channel and at least one measurement channel of the extended line (4) of transmission of wave energy into exclusively time-dependent electric signals, extracting the amplitude of the electric signal at the output of the reference channel, amplifying the electric signal at the output of the measurement channel in inverse proportion to the value of the amplitude of the electric signal at the output of the reference channel, employing a linear scale transform relating the value of the difference between the decelerations of the phase velocities, respectively, of the modes of the reference and measurement channels of the extended line (4) of transmission of wave energy to the running time of monitoring and to measurements of the values of the specified running coordinate lengthwise of the extended line (4) of transmission of wave energy, and subsequently determining the geometry of the surface of the extended shell (1), characterized in that it further includes the steps of presetting the required resolution of the monitoring procedure over the surface area of the extended shell (1), dividing the surface area of the extended shell (1) into elementary portions (2) of an arbitrary shape, the surface area of each such portion being either equal to or smaller than the surface area of the predetermined resolution of monitoring the state of the extended shell (1), placing the extended line (4) of transmission of wave energy on the surface of the extended shell (1) along the perimeters of all the thus defined portions (2) and securing it to the surface of the extended shell (1) along the perimeters of the thus defined portions (2), providing for directional interaction of the fields of the modes of at least one reference channel and at least one measurement channel lengthwise of the extended line (4) of transmission of wave energy in dependence on the curvature of a longitudinal axis (5) of the extended line (4) of transmission of wave energy, determining the values of the curvature of the surface of the extended shell (1) along the specified running coordinate (S) from normals to this surface intersecting the longitudinal axis (5) of the extended line (4) of transmission of wave energy, and employing the obtained values of the curvature of the surface of the extended shell (1) for finding and registering the initial values of two major curvatures $K_{1ij}°$, $K_{2ij}°$ for each defined portion (2), corresponding to the initial state of the extended shell (1), then determining two current values of the major curvatures $\tilde{K}_{1ij}$, $\tilde{K}_{2ij}$ for each portion (2), and comparing the current values of the major curvatures $\tilde{K}_{1ij}$, $\tilde{K}_{2ij}$ with the initial registered values of the major curvatures $\tilde{K}_{1ij}°$, $\tilde{K}_{2ij}°$ to determine the integral characteristics for each portion (2) in finding the geometry of the surface of the extended shell (1).

* * * * *